US009143567B2

(12) United States Patent
Hathorn

(10) Patent No.: US 9,143,567 B2
(45) Date of Patent: Sep. 22, 2015

(54) GATEWAY DEVICE TO CONNECT NATIVE FIBRE CHANNEL PORTS TO PURE FIBRE CHANNEL OVER ETHERNET STORAGE AREA NETWORKS

(75) Inventor: Roger G. Hathorn, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 549 days.

(21) Appl. No.: 13/534,086

(22) Filed: Jun. 27, 2012

(65) Prior Publication Data

US 2014/0003440 A1 Jan. 2, 2014

(51) Int. Cl.
*H04L 29/08* (2006.01)
*H04L 12/02* (2006.01)

(52) U.S. Cl.
CPC ............. *H04L 67/1097* (2013.01); *H04L 12/02* (2013.01); *H04L 67/2842* (2013.01)

(58) Field of Classification Search
CPC ......... H04L 12/66; H04L 12/54; H04L 12/02; H04L 67/1097; H04L 67/2842
See application file for complete search history.

(56) References Cited

U.S. PATENT DOCUMENTS

| 7,804,840 | B2 | 9/2010 | Rupanagunta et al. |
| 8,108,454 | B2 | 1/2012 | Snively et al. |
| 8,284,785 | B2 * | 10/2012 | Hirata ............................ 370/400 |
| 8,514,856 | B1 * | 8/2013 | Gai et al. ........................ 370/389 |
| 2009/0161692 | A1 | 6/2009 | Hirata et al. |
| 2009/0245791 | A1 * | 10/2009 | Thaler et al. ..................... 398/45 |
| 2009/0292813 | A1 | 11/2009 | Snively et al. |
| 2010/0165994 | A1 | 7/2010 | Narayanaswamy et al. |
| 2010/0214950 | A1 | 8/2010 | Vobbilisetty |
| 2010/0232419 | A1 | 9/2010 | Rivers |
| 2011/0044344 | A1 | 2/2011 | Hudson et al. |
| 2011/0064086 | A1 | 3/2011 | Xiong et al. |
| 2011/0188511 | A1 | 8/2011 | Di Benedetto |
| 2011/0280572 | A1 | 11/2011 | Vobbilisetty et al. |
| 2011/0299539 | A1 | 12/2011 | Rajagopal et al. |
| 2012/0039163 | A1 | 2/2012 | Nakajima |
| 2012/0155469 | A1 * | 6/2012 | Majumdar et al. ............. 370/392 |
| 2012/0195188 | A1 * | 8/2012 | Zhang ............................ 370/221 |
| 2012/0275316 | A1 * | 11/2012 | Wang ............................. 370/242 |
| 2013/0148546 | A1 | 6/2013 | Eisenhauer et al. |
| 2013/0148663 | A1 | 6/2013 | Xiong |

OTHER PUBLICATIONS

Tate et al., "IBM Converged Switch B32," Redbooks, IBM, Apr. 2011, 200 pages.

* cited by examiner

*Primary Examiner* — Anh Ngoc Nguyen
(74) *Attorney, Agent, or Firm* — Griffiths & Seaton PLLC

(57) ABSTRACT

Aa gateway device for use between a Fiber Channel over Ethernet (FCoE) network and a Fiber Channel (FC) storage area network (SAN) device includes a controller, at least one first native Fiber Channel F_Port in operable communication with the controller and configured to interface with a native Fiber Channel N_Port of the FC SAN device, and at least one first virtual N_Port (VN_Port) linked to the at least one first native Fiber Channel F_Port and in operable communication with the controller.

23 Claims, 3 Drawing Sheets

GATEWAY DEVICE TO CONNECT NATIVE FIBRE CHANNEL PORTS TO PURE FIBRE CHANNEL OVER ETHERNET STORAGE AREA NETWORKS

BACKGROUND OF THE INVENTION

1. Field of the Invention

The present invention relates in general to gateway devices, and more particularly, to gateway devices for use with Fibre Channel and Fibre Channel over Ethernet devices.

2. Description of the Related Art

Fibre Channel is a high reliability, high speed network technology that is often used in storage networking, particularly in storage area network (SAN) environments. Many data centers use Fibre Channel (FC) for storage networking, and, in conjunction, use Ethernet for TCP/IP networks. As a result, the data center has two separate networks to maintain. FCoE is a network protocol that encapsulates Fibre Channel frames in Ethernet frames in order to allow Fibre Channel to be used over an Ethernet infrastructure. FCoE thus allows storage traffic generated according to the FC protocol to share infrastructure with network traffic generated according to Ethernet protocols such as TCP/IP.

SUMMARY OF THE INVENTION

An FCoE fabric typically is built with switches and adaptors that support various FC and FCoE protocols. For example, FCoE deployments include translation devices that operate in either full FCoE switch mode (known as Fibre Channel Forwarders (FCF)) or in N_Port virtualization or aggregation mode (AG). FCFs provide full Fibre Channel services (e.g., address assignment, name server, zoning, etc.) to the FCoE fabric and converts FCoE to FC and vice versa. A FCoE switch operating in virtualization or aggregation mode allows a converged network adapter (CNA) to connect over Ethernet to a Fibre Channel SAN as if it were a native FC port. However, solutions are needed for connecting legacy Fibre Channel devices to FCoE SANs or Lossless Ethernet networks.

In this regard, innovative devices, systems, and methods are provided that seamlessly connect legacy Fibre Channel devices to FCoE devices and/or networks. In one embodiment, by way of example only, a gateway device for use between a Fibre Channel over Ethernet (FCoE) network and a Fibre Channel (FC) storage area network (SAN) device includes a controller, at least one first native Fibre Channel F_Port in operable communication with the controller and configured to interface with a native Fibre Channel N_Port of the FC SAN device, and at least one first virtual N_Port (VN_Port) linked to the at least one first native Fibre Channel F_Port and in operable communication with the controller.

In another embodiment, by way of example only, a network system includes a Fibre Channel over Ethernet (FCoE) server including at least one first virtual N_Port (VN_Port), a Fibre Channel (FC) storage including at least one first native Fibre Channel N_Port, and a gateway device in operable communication with the FCoE server and the FC storage. The gateway devices includes a controller, at least one first native Fibre Channel F_Port in operable communication with the controller and configured to interface with the at least one first native Fibre Channel N_Port of the FC storage, and at least one second virtual N_Port (VN_Port) linked to the at least one first native Fibre Channel F_Port and in operable communication with the controller and configured to communicate with the at least one first virtual N_Port (VN_Port) of the FCoE server.

In another embodiment, by way of example only, a method of connecting a native Fibre Channel port to a pure Fibre Channel over Ethernet (FCoE) Storage Area Network (SAN) devices is provided. The method includes providing a gateway device including a controller, at least one first native Fibre Channel F_Port in operable communication with the controller and configured to interface with a native Fibre Channel N_Port of the SAN, and at least one first virtual N_Port (VN_Port) linked to the at least one first native Fibre Channel F_Port and in operable communication with the controller, virtualizing a functionality of the at least one first native Fibre Channel F_Port, and performing an initialization protocol via the controller of the gateway device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide gateway devices for use between a Fibre Channel over Ethernet (FCoE) devices and Fibre Channel (FC) devices and a device in a storage area network (SAN). More particularly, the gateway device is configured to allow connectivity of a legacy Fibre Channel N-Port to a pure FCoE lossless Ethernet SAN device (e.g., a device with no FC ports). In this regard, the gateway device includes a controller, at least one first native Fibre Channel F_Port in operable communication with the controller and configured to interface with a native Fibre Channel N_Port of the SAN storage device, and at least one first virtual N_Port (VN_Port) linked to the at least one first native Fibre Channel F_Port and in operable communication with the controller and configured to interface with a VF_Port of an FCoE SAN. Methods and systems including the gateway device are also contemplated.

Figure 1:
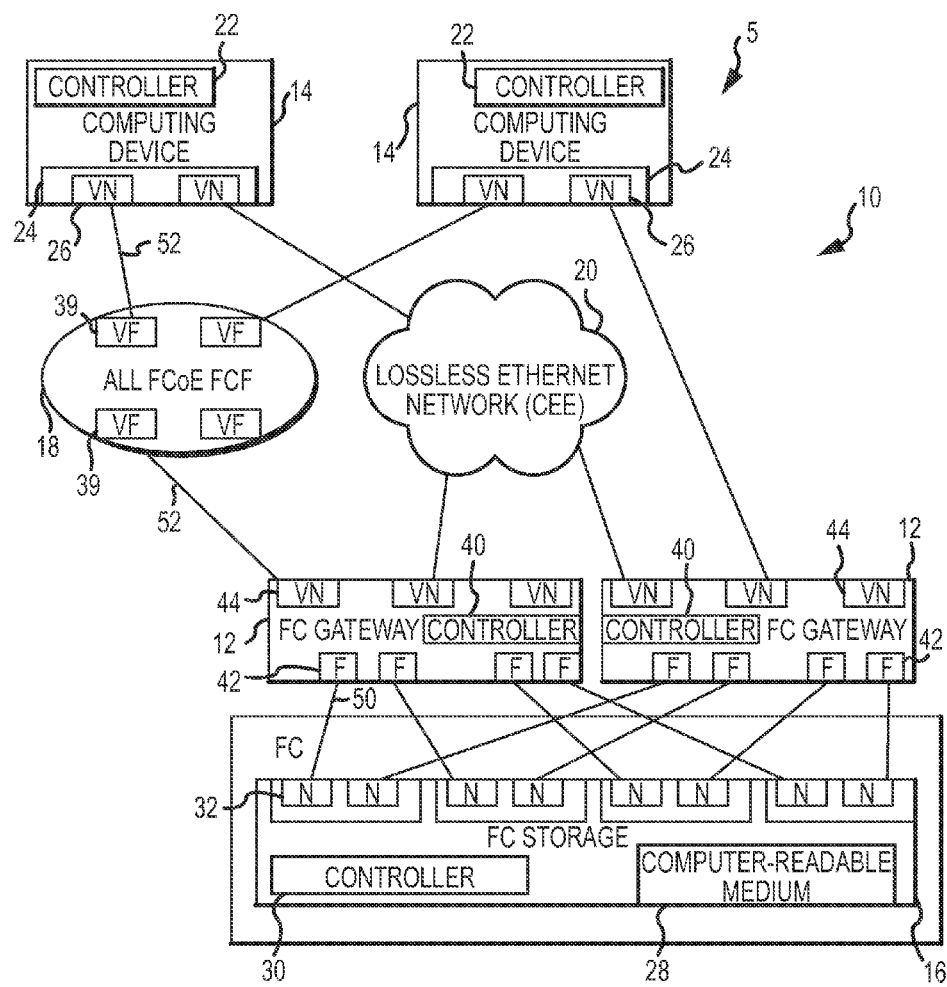
FIG. 1 illustrates a block diagram of a network system including a gateway device, according to an embodiment.

Turning to FIG. 1, a block diagram of a network system 10 including gateway devices 12 is illustrated. Network system 10 includes one or more computing devices 14 connected to a storage device 16 via one or more gateway devices 12. One or more of computing devices 14 are further linked to one or more gateway devices 12 through one or more FCoE Forwarders (FCF) 18 and/or a Lossless Ethernet Network (CEE) 20 containing at least one FCF. Computing devices 14 and FCF 18 and/or CEE 20 are included as part of one or more storage area networks (SAN). Each of these components will now be described below.

Computing devices 14 are configured to communicate data to storage device 16. In an embodiment, communication occurs using Fibre Channel over Ethernet (FCoE) protocols. In an embodiment, one or more of computing devices 14 are servers. Computing devices 14 each include controllers 22 having software and/or hardware elements configured to enable FC and FCoE communications and FC/FCoE components 24. FC/FCoE components 24 are configured to provide necessary functionality to enable FC communications over lossless Ethernet connections (e.g., to CEE 20) or over FCoE FCFs (e.g., FCF 18), and in this regard, include virtual N_Ports (VN_Port) 26 for such communications.

Storage device 16 includes a computer-readable storage medium 28, a controller 30, and one or more FC native N_Ports 32. Computer-readable storage medium 28 may be any type of computer-readable storage medium known in the art or developed in the future. For example, storage device 16 may comprise storage tape, an optical storage device, one or more disk storage devices (e.g., a RAID configuration, a JBOD configuration, etc.), and/or the like. In other embodiments, storage device 16 may include more than one computer-readable storage medium 28. In at least one of these embodiments, storage device 16 includes at least two different types of computer-readable storage media. Controller 30 may be any type of processor known in the art or developed in the future capable of performing input/output (I/O) operations on storage medium 28 via ports 32. Although FIG. 1 shows storage device 16 as including a single controller 30, various other embodiments of storage device 16 include more than one controller 30. FC native N_Ports 32 are capable of detecting SFP devices that are supported by each respective N_Port 32. According to FC protocol, each N_Port 32 is configured to be assigned to a single native fibre channel F_Port and to establish a link with that F_Port.

As noted previously, intervening components, such as FCFs 18 and/or CEE 20 may be included between gateway device 12 and computing devices 14. FCFs 18 are configured to forward translated FCoE frames over an enhanced Ethernet to devices of SAN 5 (e.g., computing devices 14). FCFs 18 include Ethernet ports, e.g., virtual F_Ports 39, which are virtually linked via virtual links 52 to corresponding VN_Ports 26 of computing devices 14. CEE 20 similarly includes FCFs (not shown), but presents VN_Ports 26 of devices 14 as ports thereon.

To allow FC N_Port 32 of storage device 16 to connect with a corresponding VN_Port 26 of computing devices 14, gateway device 12 is employed. Gateway device 12 includes a controller 40, one or more native Fibre Channel (FC) F_Ports 42, and one or more FCoE virtual N_Ports (VN_Ports) 44. Controller 40 resides in an E-Node of gateway device 12 and is configured to perform various discovery, initialization, and other FCoE protocols typically designated for a VN_Port capable MAC. Controller 40 may be any type of processor or processing portion of a device known in the art or developed in the future capable of performing input/output (I/O) operations on gateway device 12. FC F_Ports 42 are in operable communication with controller 40 and configured to interface with FC N_Port 32 of storage device 16 via physical links 50. Physical links 50 include, but are not limited to cables and other physical devices suitable for physically connecting two ports. In an embodiment, FC F_Ports 42 are adapted to virtualize the functionality of the F_Port in a FC switch as described by T11/FC-FS-2 and FC-SW-5 standards. VN_Ports 44 are in operable communication with controller 40 and are configured to be accessed by and to form virtual links 52 with VN_Ports 26 of computing device 14 or other VF_Ports (e.g., VF_Ports 39 of FCF 18).

Figure 2:
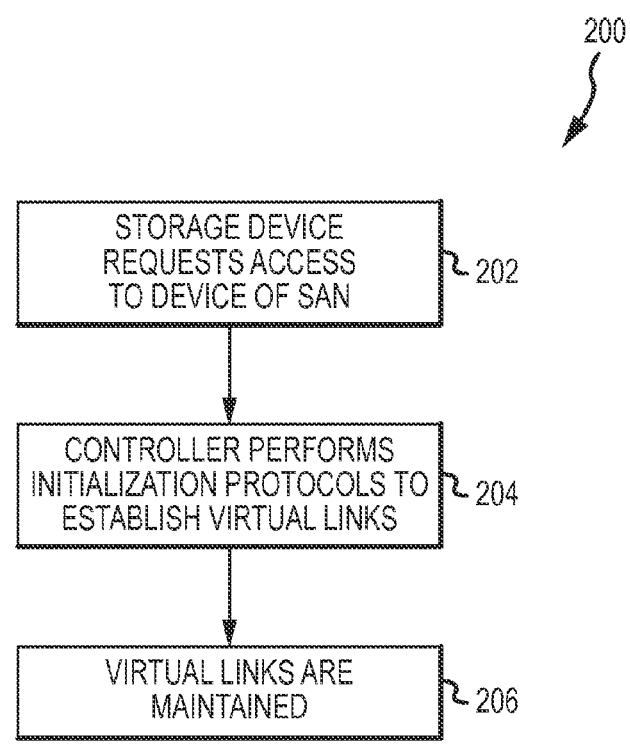
FIG. 2 illustrates a flow diagram of a method of operating network system of FIG. 1, according to an embodiment.

FIG. 2 is a flow diagram of a method 200 of operating system 10, according to an embodiment. During operation, storage device 16 may request access to device 14 of SAN 5 at 202. In order to do so, gateway device 12 initially is connected to storage device 16 such that each N_Port 32 of storage device 16 is linked via physical link 50 to a corresponding F_Port 42 on gateway device 12. Physical links 50 between N_Ports 32 and F_Ports 42 are established according to Fibre Channel protocols. As a result of linking gateway device 12 to storage device 16, VN_Ports 44 of gateway device 12 allows storage device 16 to appear to present native FCoE VN_Ports to SAN 5.

Controller 40 performs FCoE initialization protocols as required by the T11/FC-BB-5 standard for a VN_Port Capable MAC to establish virtual links 52 at 204. FCoE initialization protocols includes, but are not limited to virtual local area network (VLAN) discovery protocols, FCF discovery protocols, virtual link instantiation protocols, virtual link maintenance protocols, and other protocols. VLAN discovery protocols determine the VLANs for which FCoE protocols are supported. FCF discovery protocols are used to discover FCFs in the FCoE SAN. During VLAN Virtual Link Instantiation Protocols, controller 40 establishes virtual links 52 between VN_Ports 44 of gateway device 12 and one or more of CEE 20 and/or corresponding VF_Ports 39 of FCFs 18.

N_Port of 32 of each storage device 16 performs a Fabric Login (FLOGI) operation, the FC FLOGI request received by F_Port 42 is translated by controller 40 to a FIP FLOGI request and is sent on VN_Port 44 to a previously discovered FCF 18 (at 204) to instantiate FCoE virtual link 52 according to T11/FC-BB-5 standards. Alternatively, a FC FLOGI request received by F_Port 42 is translated to a FIP N_Port ID Virtualization (NPIV) discover service fabric parameters (FDISC) request and is sent on VN_Port 44 to a corresponding FCF 18 instantiating a virtual link, e.g., link 52. In an embodiment in which many FC IDs are requested using discover service fabric parameters (FDISC) requests, such requests are encapsulated into FIP requests and sent to FCFs 18. In an example, FC FDISC requests received by F_Port 42 are translated into FIP N_Port ID Virtualization (NPIV) discover service fabric parameters (FDISC) and are sent on VN_Port 44 to FCF 18, to establish another virtual link. When the FIP FLOGI or FIP FDISC request is accepted (e.g., FIP FLOGI LS_ACC or FIP FDISC LS_ACC), it is translated to a FC LS_ACC response with the FC_ID assigned by FCF 18. F_Ports 42 are mapped to VN_Ports 44 via configuration (e.g., port to port or VLAN) mapping or by implementing load balancing algorithms with multiple paths to FCFs 18 on the same VLAN.

When virtual links 52 are established, any native FC frames received from storage device 16 by gateway device 18 (e.g., via F_Port 26) are encapsulated into FCoE frames and sent through VN_Ports 44 to FCFs 18. Any FCoE frames received on VN_Ports 44 are de-encapsulated and sent through F_Port 42 to storage device 16. Translation (i.e., encapsulation and/or de-capsulation) is performed according to known methods.

Virtual and physical links 52 and 50 are maintained at 206. FCoE controller 40 maintains virtual links 52 by implementing Virtual Link Maintenance Protocols as delineated in T11/FC-BB-5. Virtual Link Maintenance protocols include sending of VN_Port and E_Node FIP Keep Alive messages to FCF 18 and monitoring reception of FIP Discovery Advertisements from FCF 18 to ensure communication between FCF 18 and the VN_Ports 44 on the gateway device is maintained.

If a failure of one or more of virtual link 52 between VN_Ports 44 and VF_Ports 39 is detected during link maintenance, such failure is reflected on F_Port 42 of gateway device 18 using FC primitive sequences. In particular, the FC primitive sequences indicate the operational state of the link e.g., not operational (NOS), offline (OLS), and the like. If a failure of one or more of physical links 50 is detected by F_Port 42 of gateway device 18, such failure is reflected to the FCoE virtual link 52 by sending a FIP encapsulated logout (LOGO) to the FCF for each of the currently established virtual links.

Figure 3:
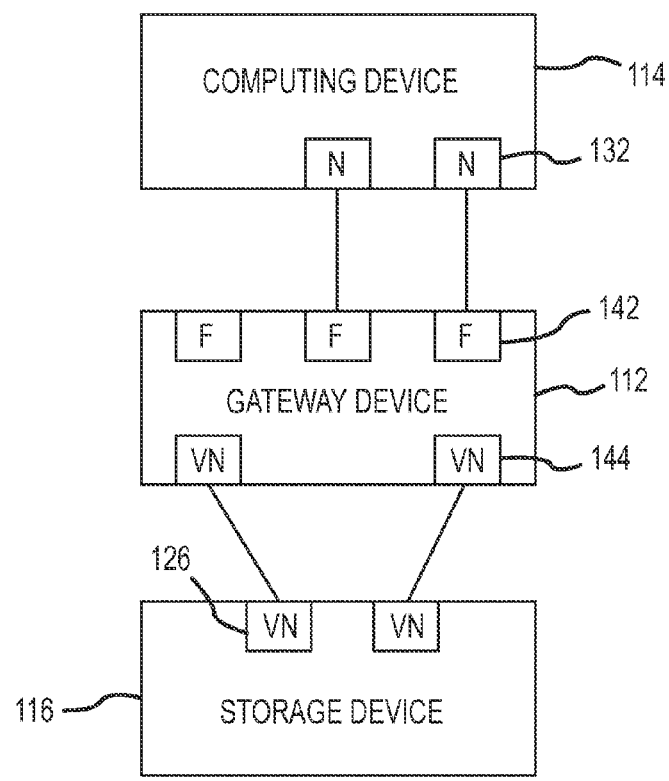
FIG. 3 illustrates an additional block diagram of a network system including a gateway device, according to an embodiment.

By employing gateway device 18 as described above, legacy Fibre Channel devices are able to connect to FCoE devices of a SAN. In particular, inclusion of both FC and Ethernet ports on a single gateway device provides multipoint connectivity between the legacy FC devices and FCoE devices of a SAN. Although computing devices 14 are described as communicating with storage devices 16 via FCoE protocols, FC protocols are employed in other embodiments. In an example, as shown in FIG. 3, computing devices 114, configured substantially similar to computing devices 14, alternatively are configured to communicate with storage devices 116, configured substantially similarly to storage devices 16, according to FC protocols, and devices 114 comprise FC servers or computing device while storage devices 116 comprise FCoE storage devices. In such a configuration, F_Ports 142, configured substantially similarly to F_Ports 42, on gateway device 112 (substantially similarly configured to device 12) communicate with N_Ports 132 (similar to N_Ports 32) of computing devices 114, VN_Ports 144 (similar to VN_Ports 44) of gateway device 112 are virtually linked to VN_Ports 126 (similar to VN_Ports 26) of storage device 114, and the basic operations and configurations described above continue to be applicable.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A gateway device for use between a Fibre Channel over Ethernet (FCoE) network and a Fibre Channel (FC) storage area network (SAN) device comprising:

a controller;
at least one first native Fibre Channel F_Port (FCF) in operable communication with the controller and configured to interface with a native Fibre Channel N_Port of the FC SAN device; and
at least one first virtual N_Port (VN_Port) linked to the at least one first native Fibre Channel F_Port and in operable communication with the controller;
wherein the controller is configured to translate a first Fibre Channel (FC) Fabric Login (FLOGI) received by the at least one first native Fibre Channel F_Port into a Fibre Channel Initiation Protocol Login (FIP FLOGI) and to send the FIP FLOGI to a discovered FCF.

2. The gateway device of claim 1, wherein the at least one first VN_Port virtually links to at least one virtual F_Port (VF_Port).

3. The gateway device of claim 1, wherein the at least one first VN_Port virtually links with a lossless Ethernet network (CEE) having at least one FCoE forwarder (FCF).

4. The gateway device of claim 1, wherein the controller is configured to perform FCoE initialization protocols.

5. The gateway device of claim 4, wherein the FCoE initialization protocols comprise a VN_Port capable MAC protocol selected from a group consisting of virtual local area network (VLAN) discovery protocols, FCF discovery protocols, virtual link instantiation protocols, and virtual link maintenance protocols.

6. The gateway device of claim 1, wherein the controller is configured to perform a virtual link instantiation when a Fabric Login (FLOGI) is received from a Fibre Channel device.

7. The gateway device of claim 6, wherein the controller is further configured to translate a first FC FLOGI received by the at least one first native Fibre Channel F_Port into a FIP N_Port ID Virtualization (NPIV) discover service fabric parameter (FDISC) and to send the FIP NPIV FDISC to an FCF to instantiate a virtual link.

8. The gateway device of claim 7, wherein the controller is further configured to translate an FC FDISC received by the at least one first native Fibre Channel F_Port into an FIP NPIV FDISC and to send the FIP NPIV FDISC on the at least one first virtual N_Port (VN_Port) to establish another virtual link.

9. A network system comprising:
a Fibre Channel over Ethernet (FCoE) server including at least one first virtual N_Port (VN_Port);
a Fibre Channel (FC) storage in operable communication with the FCoE server including at least one first native Fibre Channel N_Port; and
a gateway device in communication with the FC storage including:
a controller;
at least one first native Fibre Channel F_Port (FCF) in operable communication with the controller and interfacing with the at least one first native Fibre Channel N_Port of the FC storage; and
at least one second virtual N_Port (VN_Port) linked to the at least one first native Fibre Channel F_Port and in operable communication with the controller;
wherein the controller is configured to translate a first Fibre Channel (FC) Fabric Login (FLOGI) received by the at least one first native Fibre Channel F_Port into a Fibre Channel Initiation Protocol Login (FIP FLOGI) and to send the FIP FLOGI to a discovered FCF.

10. The network system of claim 9, further comprising a lossless Ethernet network (CEE) including at least one FCoE Forwarder (FCF) in operable communication with the at least one first VN_Port of the FCoE server and the at least one second VN_Port of the gateway device.

11. The network system of claim 9, further comprising a FCF including a first virtual F_Port (VF_Port) linking with the at least one first VN_Port of the FCoE server and a second VF_Port linking with the at least one second VN_Port of the gateway device.

12. The network system of claim 9, wherein the controller of the gateway device is configured to perform FCoE initialization protocols.

13. The gateway device of claim 12, wherein the FCoE initialization protocols comprise a VN_Port capable MAC protocol selected from a group consisting of virtual local area network (VLAN) discovery protocols, FCF discovery protocols, virtual link instantiation protocols, and virtual link maintenance protocols.

14. A method of connecting a native Fibre Channel port to a pure Fibre Channel over Ethernet (FCoE) Storage Area Network (SAN) comprising:
providing a gateway device including a controller, at least one first native Fibre Channel F_Port (FCF) in operable communication with the controller and configured to interface with a native Fibre Channel N_Port of the SAN, and at least one first virtual N_Port (VN_Port) linked to the at least one first native Fibre Channel F_Port and in operable communication with the controller;
virtualizing a functionality of the at least one first native Fibre Channel F_Port (FCF);
performing an initialization protocol via the controller of the gateway device;
translating a first Fibre Channel (FC) Fabric Login (FLOGI) received by the at least one first native Fibre Channel F_Port into a Fibre Channel Initiation Protocol Login (FIP FLOGI); and
sending the FIP FLOGI to a discovered FCF.

15. The method of claim 14, further comprising performing a virtual local area network discovery protocol.

16. The method of claim 15, further comprising performing a FCoE Forwarder (FCF) discovery protocol.

17. The method of claim 16, further comprising performing a fabric Fabric Login (FLOGI) operation.

18. The method of claim 17, wherein performing the FLOGI operation includes performing a virtual link instantiation when FLOGI is received from a Fibre Channel device to establish a virtual link.

19. The method of claim 17, wherein performing the FLOGI operation includes translating the first FC FLOGI received by the at least one first native Fibre Channel F_Port into a Fibre Channel Initiation Protocol (FIP) N_Port ID Virtualization (NPIV) discovery service fabric parameter (FDISC) and sending the FIP NPIV FDISC to a FCF to instantiate a virtual link.

20. The method of claim 19, wherein performing the FLOGI operation includes translating an FC FDISC received by the at least one first native Fibre Channel F_Port into an FIP NPIV FDISC and sending the FIP NPIV FDISC on the at least one first virtual N_Port (VN_Port) to establish another virtual link.

21. The method of claim 18, further comprising performing virtual link maintenance on the established virtual link.

22. The method of claim 21, further comprising detecting a failure on the established virtual link and indicating the failure on the at least one first native Fibre Channel F_Port of the gateway device.

23. The method of claim 17, wherein performing the FLOGI operation includes translating a first Fibre Channel (FC) FLOGI received by the at least one first native Fibre Channel F_Port into a Fibre Channel Initiation Protocol (FIP) FLOGI and sending the FIP FLOGI to a discovered FCF via the at least one first virtual N_Port (VN_Port).

* * * * *